United States Patent [19]
Carter

[11] 3,716,927
[45] Feb. 20, 1973

[54] WHEEL WEIGHT DEMONSTRATING DEVICE

[75] Inventor: Warren E. Carter, Murfreesboro, Tenn.

[73] Assignee: Perfect Equipment Corporation, Murfreesboro, Tenn.

[22] Filed: Nov. 29, 1971

[21] Appl. No.: 202,875

[52] U.S. Cl............................35/19 R, 35/10, 35/49
[51] Int. Cl.................................................G09b 23/10
[58] Field of Search...............35/10, 13, 19 R, 29, 49

[56] References Cited

UNITED STATES PATENTS

| | | | |
|---|---|---|---|
| 2,319,037 | 5/1943 | Castiglia | 35/19 R |
| 2,449,499 | 9/1948 | Milburn | 35/13 |
| 2,492,066 | 12/1949 | Schildmeier | 35/10 |

*Primary Examiner*—Harland S. Skogquist
*Attorney*—Paul M. Denk

[57] ABSTRACT

In a device for demonstrating the effectiveness of the balancing attributes of a standard wheel balance weight, a wheel is rotatably mounted to the end of the handle, and said wheel incorporates a fixed weight that is eccentrically mounted for the purpose of inducing unbalanced-oscillatory type rotation of the wheel when turned for the purpose of displaying an unbalanced condition in the mounting of a wheel, as for example, an automobile wheel. The invention includes essentially a clip that is mounted for restrained pivotal movement proximate that surface of the rim opposite its mounting to the handle, and said clip is provided with a turned or bent distal end to which a regular wheel weight may be mounted. The surface of the rim proximate the location of this clip is relatively flat, and can easily support any form of visual display matter such as advertising, or a wheel weight chart, or the like, which can be viewed in combination with the manipulation of the wheel weight so as to depict the balancing condition that is achieved through the affixing of one or more wheel weights to the rim of an auto-mobile. wheel.

7 Claims, 6 Drawing Figures

PATENTED FEB 20 1973　3,716,927

INVENTOR
WARREN E. CARTER
BY Paul M. Hand
ATTORNEY

WHEEL WEIGHT DEMONSTRATING DEVICE

BACKGROUND OF THE INVENTION

This invention relates generally to a standard wheel balancing weight display, and more particularly, provides means for conveniently displaying the effectiveness of the standard weight when mounted to an automobile wheel for the purpose of creating a balanced wheel condition.

As is commonly known in the automotive trade, wheels have a tendency of becoming unbalanced in their precise distribution of weight around their mounting axle, and as a result, an automobile can experience a form of vibratory movement depending upon the amount of the unbalance, or the tire tread has a tendency to wear unevenly as a result of this predicament. Hence, wheel weights have been devised for being precisely clamped intermediate the rubber tire and the wheel rim for the purpose of properly balancing the wheel's weight symetrically around its mounting axle, so as to obviate this problem.

It has been desirable in demonstrating the value of wheel balance weights in properly equalizing the tire weight around an axle to provide a model of a wheel which may contain eccentrically placed weights, and which when spun shows the vibratory type movements representative of those that may be induced in an unbalanced automobile tire. One such model balancer is shown in the U.S. Pat. to B. Castiglia, No. 2,319,037, which shows a wheel rotatably mounted to a handle, and having a pair of fixed weights, in addition to a slidable weight, mounted within the backside of said wheel, for the purpose of showing the rotation of a wheel either in a balanced condition, or unbalanced condition. The present invention improves upon the basic feature of this prior art patent by embedding the unbalanced weight within the rim of the wheel, and out of sight, and then clearly displays for easy viewing a standard wheel weight upon a pivotally mounted clip, and in that position it usually maintains intermediate a tire and its rim on an average automobile. Thus, the observer may easily see the attributes of how a standard wheel weight can bring an unbalanced wheel into a condition of stability providing for uniform and non-vibratory type rotation to any wheel.

It is therefore, the principal object of this invention to provide a wheel weight demonstrating device which conveniently provides means upon the front portion of the wheel for mounting of a wheel weight of predetermined size and which can be manipulated to clearly show the attributes of such a weight in balancing a wheel.

It is another object of this invention to provide a demonstrating device wherein a standard wheel weight may be mounted as its usual position proximate the location where a tire mounts upon the rim of a simulated or prototype of an automobile wheel, and which weight can be adjusted so as to clearly indicate the balancing of said wheel, or even an unbalanced condition by shifting the weight to provide an unequal distribution of weight around its axle.

It is a further object of this invention to provide a wheel weight demonstrating device that mounts the standard wheel weight to the frontal portion of the tire and in that position where it is most customarily used, while simultaneously providing a planar surface upon the frontal portion of the wheel rim to which various types of display material or advertising may be attached.

Other objects of this invention will become more apparent to those skilled in the art in the light of the following summary, description of its preferred embodiment, and the drawings.

SUMMARY OF THE INVENTION

This wheel weight demonstrating device essentially comprises the rotatably mounting of a wheel, and for realistic purposes, one that may include a tire mounted to a rim, to a handle, and which wheel may be spun upon the same for the purpose of simulating the usual rotation of an automobile tire upon its axle. The rim of this invention is designed in two parts, and which parts may be brought together to form a complete rim, but which along one peripheral edge is designed having a segmental slot into which a fixed weight may be disposed, and which essentially causes the wheel, when turned, to exhibit vibratory movements, particularly to the hand of the individual holding this device, and which vibratory movements are representative of an unbalanced automobile tire. On the front side of the wheel of this invention there is mounted for forced pivotal movement a clip which is radially disposed, being pivotally mounted as aforesaid proximate one end centrally of the wheel, while its other end is turned and bent for the purpose of accommodating the mounting of a standard form of wheel balance weight. Through forced pivotal movement of the wheel weight upon its clip, the weight may be pivoted in a direction which tends to unequalize the distribution of weight around the wheel, so that when it is rotated, there will clearly be exhibited the aforesaid oscillatory and unbalanced type of condition. On the other hand, the wheel weight is of that size which has been designed to provide for equalization of the weights, and to provide a balanced condition when the two weights are diametrically disposed at approximately opposite directions on the wheel. Thus, when the said wheel weight has been forcefully pivoted to lie diametrically of said fixed weight, the wheel will be in a substantially balanced condition, so that when the wheel is forcefully rotated, it will show smooth rotation which simulates the desirable rotation that may be achieved in an automobile wheel that has been precisely balanced through the use of such standard wheel balancing weights. Since the clip and the mounted wheel weight are disposed upon the front side of the wheel, it is clearly in view of any observer, who can readily distinguish the desired results that can be achieved in balancing such a wheel through the use of this type of a weight(s). On the other hand, as stated, by merely shifting the weight to the side, and in a position where it is disposed other than at a 180° angle from the fixed weight within the rim, then the observer may readily see the vibratory type of movements that are caused in such a wheel due to its unequal weight around an axle.

In addition to the foregoing structural features of this invention, the rim is provided with a concentrically disposed substantially planar or flat surface intermediate its central axle handle mounting portion and the disposition of the tire around the same, so that any type of printed matter, such as advertising, may be af-

DESCRIPTION OF THE PREFERRED EMBODIMENT

Figure 1:
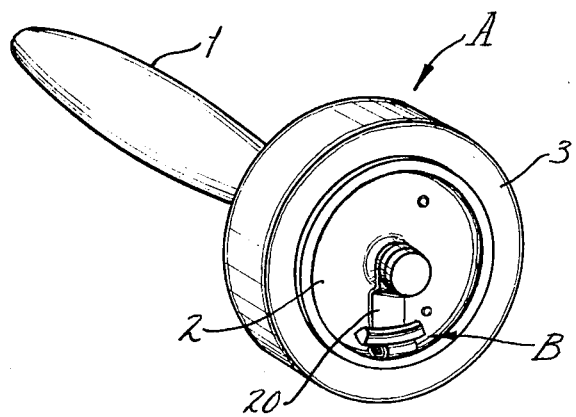
FIG. 1 is a perspective view of the rotatably mounted wheel and handle of this invention disclosing the wheel weight being visibly fixed in place to its clip.
Figure 3:
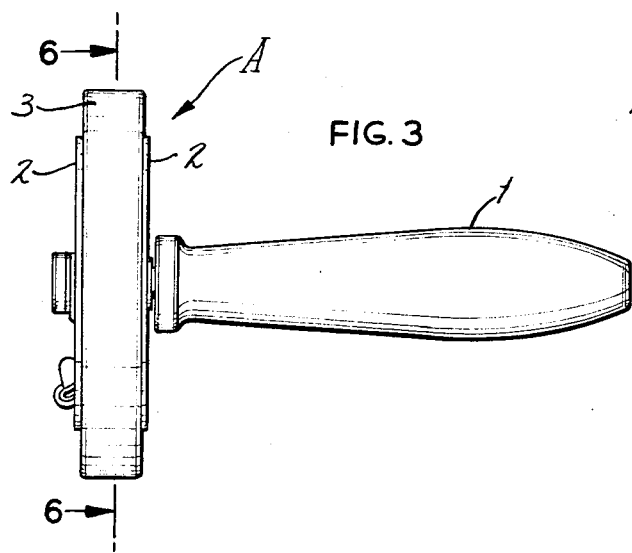
FIG. 3 provides a side view of the invention disclosed in FIG. 1.

In referring to the drawings, and in particular to FIGS. 1 and 3, the invention is disclosed as comprising a wheel A that is mounted for rotation to one end of a handle 1, which handle is designed having sufficient length and formed contours so as to accommodate and facilitate its grasping and holding by an individual. The wheel A is basically comprised of a rim portion 2 which has mounted circumferentially thereon a tire 3, which rim and tire are designed to simulate similar members that are standard components upon an automobile. Although, for purposes of this invention the wheel need not specifically be formed having both a rim and tire portions, but rather, the wheel may be formed as an integral member.

Figure 5:
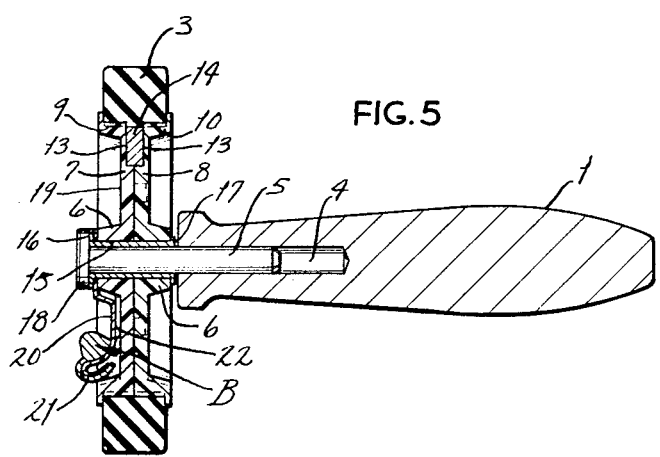
FIG. 5 is a longitudinal sectional view taken along the line 5—5 of FIG. 2.

Referring to FIG. 5, it can be seen that the handle 1 is designed having a blind hole, as at 4, which is of a size to accommodate in fixed, press fitting engagement, a pin 5, with the pin only being tightly inserted into said handle that distance which still allows the boss like center portions 6 of the rim to have sufficient clearance to provide for its freedom of rotation around said pin and with respect to the handle. Actually, the pin may be affixed to the handle by other methods, such as by a threaded engagement.

Figure 4:
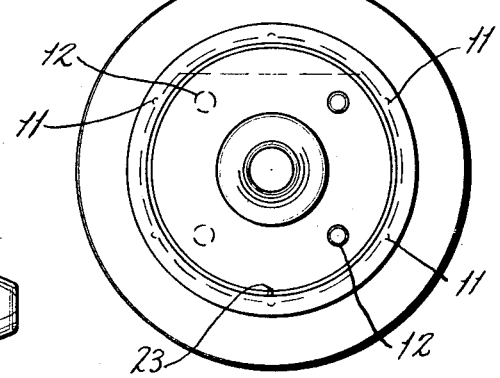
FIG. 4 provides a back view of the wheel, including its rim and tire with the handle having been removed.
Figure 6:
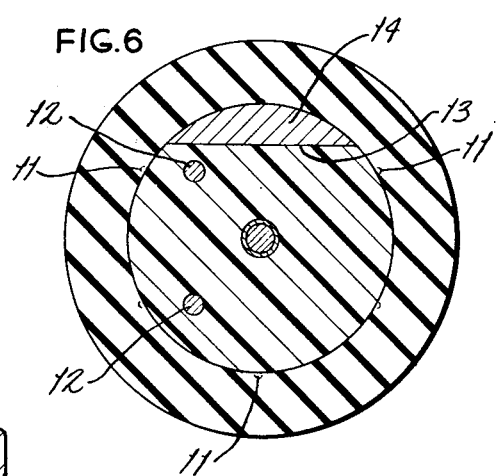
FIG. 6 provides a transverse sectional view of the wheel taken along the line 6—6 of FIG. 3.

The rim 2 is basically designed in two mating halves 7 and 8, each having its boss like projection 6 formed at its inner periphery, and having flanged edges 9 and 10 formed along their outer circumferences to provide a convenient seat for holding the tire 3. By referring also to FIGS. 4 and 6, it can be seen that the flanged portions 9 and 10 of the rim are formed having spaced ribs, as at 11, so as to provide a snug retention of the tire upon said rim. To provide for the engagement and alignment of each half of said rim together, there are provided a series of rivet like members 12, which may be inserted through corresponding apertures provided in each rim, and then peened or otherwise fastened to hold said rims together. Where said rims are molded from any form of polymer like material, such as polyethylene, nylon, an acetal resin, or any other similar and wear resistant material, each rim half may be formed having a pair of projecting rivet like members, in addition to another pair of apertures, and this set of rivets and apertures may be formed so as to accommodate cooperating rivet and apertures formed on the opposite half of said rim so that they may be intermated and likewise peened or otherwise fastened to hold said components together.

Each rim half 7 and 8 is formed having a segmental slot, as at 13, formed at one portion of their circumferences, and these slots are designed for alignment as when the two rim halves are brought together to complete said rim. See also FIG. 5. A weighted member 14, formed of lead or any other similar weighty material, is designed for insertion within said mating slots when said rim halves are affixed together, and with the overlying relationship of the tire 3, said weight is fixed in place within said rim thereby providing for an eccentric weight loading of the wheel. This eccentricity in the weight of the wheel, through the insertion of this weighted member, provides for an unequal distribution of weight around said wheel, and when it is spun upon its handle, provides for a very distinct and obvious oscillation to the rotating member, which can not only be visually observed, but also clearly felt by the individual holding this demonstrating device. Thus, such unequal rotation clearly exhibits an unbalanced condition in a wheel of this type, and provides a convenient manner in which a simulated unbalanced condition in actual automobile wheels can be easily described and experienced.

To facilitate the ease of rotation of the rim 2 upon the pin 5, a ferrule or bushing 15 having a flanged end 16 and a flared end 17 is designed to conveniently embrace the inner periphery of said rim, and freely mounts for rotation upon the shank portion of the pin 5. This ferrule may be formed of metal, Teflon, other plastic, or any other form of material that may be wear resistant and used for this purpose. There should be sufficient clearance between the flared and flanged ends of this bushing intermediate the head 18 of the pin and the shoulder of the handle 1, so that there will be no obstruction to the ease of rotation of said bushing and its rim when it is forced into rapid turning movement as when spun by the hand of the operator.

It should be noted that the front side of the rim 2 is provided with a substantially flat and planar surface, as at 19, which is arranged somewhat concentric of the rim and is disposed for receiving thereon any type of printed material, such as advertising matter, or any form of decal, which may be used to display any form of automotive information, such as about standard automotive balancing weights, such as the type being displayed in this device. In addition, such a flat surface is also provided on the back side of the wheel and can be used for the same purpose.

Figure 2:
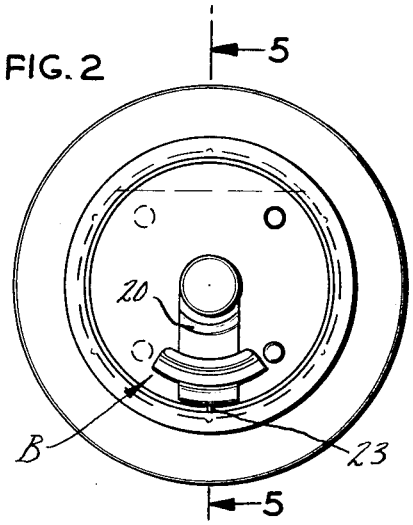
FIG. 2 is a front view of the invention disclosed in FIG. 1.

By referring to FIGS. 2 and 5, there is shown a clip 20, that is formed having an aperture at one end, and which aperture is designed to fit around the bushing 15 and intermediate its flanged end 16 and the boss portion 6 of the contiguous rim. The fitting of this clip intermediate these two components is maintained rather snugly, so that it requires some force to cause a pivotal movement of said slip with respect to the wheel, even though said clip is designed for freely rotating with the wheel around the pin 5. The other end of said clip 17 is provided with means to facilitate the adherence of a standard automotive wheel weight thereto, and this mounting means, in this particular instance, is shown as a bent configuration, as at 21, to accommodate mounting of such a wheel weight. The wheel weight B in this particular instance comprises a partially arcuate shaped lead weight portion and having projecting therefrom a thin strip of metal which is malleable and may be bent into a tight and secure fitting, in this case, around the bent portion 21. In regular use, this type of a wheel balancing weight is mounted directly to the automobile rim to provide symmetry of weight to its wheel. The clip is also provided with one or more projections, as at 22, so as to maintain a slight spacing between said clip and the flat surface 19 that may be holding, as previously mentioned, printed matter.

Obviously the size of the wheel weight to be displayed in this particular device will be of that size and weight to provide for a proportionate equilibrium of the weight around the wheel when said weight is disposed diametrically from the fixed weight 14, which is embedded within the rim. The particular size of the standard wheel balance weight being displayed will naturally depend upon the magnitude of the fixed weight, in addition to the size of the demonstrator wheel A. In any event, it is desired that the wheel weight 19 being displayed will be of sufficient weight which, when its clip 17 is pivoted into alignment with the indicator bead 23, the entire wheel A will be in proper balance, and can be rotated around its handle without any vibratory movement. On the other hand, and to display the effects of an unbalanced wheel condition when in operation, one may slightly pivot the weight B and its clip 17 for a slight distance to either side, and when the wheel is rotated, one may easily observe the vibrations imparted to the wheel when exposed to this type of problem.

Numerous variations in the construction of this wheel weight demonstrating device, within the scope of the appended claims, may occur to those skilled in the art in light of the foregoing disclosure. The preferred embodiment shown is merely illustrative of the principle of this invention which is designed to provide for a direct observance of the attributes of a standard wheel weight in providing balancing of an automotive wheel.

Having thus described the invention, what is claimed and desired to be secured by Letters Patent is:

1. A balanced-unbalanced wheel weight demonstrator including a handle, a rim, a tire mounted on said rim, a pin means rotatably mounting said rim and tire to said handle, a radially extending clip capable of forced pivotal movement relative said rim being mounted intermediate said pin and rim, said clip at its distal end having means to accommodate mounting of the standard balance weight.

2. The invention of claim 1 wherein said means for mounting the balance weight includes a bend in said clip to which said weight may be affixed.

3. A balance-unbalanced wheel weight demonstrator of the type incorporating a rim and tire that are rotatably mounted to a handle, and including fixed and moveable weights to demonstrate said balanced and unbalanced conditions, the improvement which comprises, a bushing tightly mounted within an aperture provided through the center of said rim, said bushing having a flange formed on its end remote from the handle, a clip mounted for forced pivotal movement intermediate said flange and the proximate surface of the rim, the clip at its distal end being bent to accommodate mounting of the standard wheel weight, and a pin rotatably mounting said bushing, clip, and rim to the handle.

4. The invention of claim 3 and including a fixed weight connecting to said rim, and the disposition of said wheel weight when disposed diametrically of said fixed weight providing for balanced rotation of said rim and tire.

5. The invention of claim 3 wherein said rim is formed of a pair of half rim portions, there being a segmental slot formed proximate the peripheral edge of each portion and designed for alignment into a full slot for accommodating the fixed weight when the rim portions are secured together, and means formed on each rim portion to provide for their alignment when secured together.

6. In an apparatus for providing visual display of the wheel balancing attributes of a standard automobile balance weight, said apparatus being of the type which incorporates a wheel rotatably mounted to a handle, and including fixed and moveable weights to demonstrate said balanced and unbalanced conditions, the improvement which comprises, said wheel including a rim having an inner concentric relatively flat surface exposed on its side opposite the mounted handle, a pin rotatably mounting said rim to the handle, a radially extending clip mounted for restrained pivotal movement with respect to said rim and disposed proximate said flat surface, and said clip being turned at its distal end to accommodate the mounting of the moveable balance weight.

7. The invention of claim 5 wherein the relatively flat surface of the rim exposed opposite the handle is disposed for supporting display material.

* * * * *